United States Patent
Gu et al.

(10) Patent No.: US 10,778,061 B2
(45) Date of Patent: Sep. 15, 2020

(54) FLYWHEEL ENERGY STORAGE SYSTEM

(71) Applicant: INDUSTRIAL TECHNOLOGY RESEARCH INSTITUTE, Hsinchu (TW)

(72) Inventors: Huan-Lung Gu, Hualien (TW); Ming-Tsan Peng, Taoyuan (TW); Chia-Lin Wu, Kaohsiung (TW); Yee-Pien Yang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 55 days.

(21) Appl. No.: 16/230,041

(22) Filed: Dec. 21, 2018

(65) Prior Publication Data

US 2020/0144886 A1 May 7, 2020

(30) Foreign Application Priority Data

Nov. 7, 2018 (TW) .............................. 107139438 A (51) Int. Cl.
*H02K 7/02* (2006.01)
*H02K 5/128* (2006.01)
(Continued)

(52) U.S. Cl.
CPC .......... *H02K 7/025* (2013.01); *H02K 1/2786* (2013.01); *H02K 5/128* (2013.01); *H02K 7/09* (2013.01); *H02K 5/1737* (2013.01)

(58) Field of Classification Search
CPC ............... H02K 16/00–04; H02K 7/02; H02K 5/22–225; H02K 5/128–1287
(Continued)

(56) References Cited

U.S. PATENT DOCUMENTS 4,159,427 A 6/1979 Wiedemann
4,563,046 A 1/1986 Shimamoto
(Continued)

FOREIGN PATENT DOCUMENTS

CN 101893038 A 11/2010
CN 106870634 A 6/2017
(Continued)

OTHER PUBLICATIONS

Machine Translation, Shimada, JP-2004229330-A, Aug. 2004. (Year: 2004).*
(Continued)

*Primary Examiner* — Thomas Truong
(74) *Attorney, Agent, or Firm* — Locke Lord LLP; Tim Tingkang Xia, Esq.

(57) ABSTRACT

The disclosure relates to a flywheel energy storage system including a casing, shaft, flywheel, and electric motor assembly. The casing has an inner vacuum chamber, at least one outer accommodating slot and at least one separator which separates the inner vacuum chamber from the at least one outer accommodating slot. The shaft is rotatably disposed in the inner vacuum chamber. The flywheel is located in the inner vacuum chamber and fixed to the shaft. The electric motor assembly includes a first motor rotor and a motor stator. The motor stator is accommodated in the at least one outer accommodating slot and fixed to the at least one separator. The first motor rotor is fixed on the shaft and located between the shaft and the motor stator. Part of the at least one separator located between the first motor rotor and the motor stator includes magnetically permeable material.

9 Claims, 6 Drawing Sheets

(51) Int. Cl.
*H02K 1/27* (2006.01)
*H02K 7/09* (2006.01)
*H02K 5/173* (2006.01)

(58) Field of Classification Search
USPC ............................................ 310/54, 71, 86
See application file for complete search history.

(56) References Cited

U.S. PATENT DOCUMENTS

| | | | |
|---|---|---|---|
| 4,700,094 A | | 10/1987 | Downer et al. |
| 5,334,897 A | * | 8/1994 | Ineson ................... H02K 5/08 310/89 |
| 5,708,312 A | * | 1/1998 | Rosen ................ F16C 32/0451 180/165 |
| 5,760,506 A | | 6/1998 | Ahlstrom et al. |
| 6,138,527 A | | 10/2000 | Bitterly et al. |
| 7,034,420 B2 | | 4/2006 | Brackett et al. |
| 7,109,622 B2 | | 9/2006 | Khalizadeh |
| 8,030,787 B2 | | 10/2011 | Kalev |
| 9,391,489 B2 | | 7/2016 | Atkins et al. |
| 9,831,742 B2 | | 11/2017 | Kalev et al. |
| 9,950,604 B2 | | 4/2018 | Wesolowski et al. |
| 2010/0156219 A1 | | 6/2010 | Wang |
| 2014/0026552 A1 | | 1/2014 | Koiwai et al. |
| 2014/0060241 A1 | | 3/2014 | Atkins et al. |
| 2014/0070639 A1 | * | 3/2014 | Tamura ................... H02K 3/24 310/54 |
| 2018/0273016 A1 | | 9/2018 | Xu |

FOREIGN PATENT DOCUMENTS

| | | | |
|---|---|---|---|
| EP | 3280035 A1 | | 2/2018 |
| JP | 2004229330 A | * | 8/2004 |
| TW | M433021 U | | 7/2012 |
| TW | M585447 U | | 10/2019 |

OTHER PUBLICATIONS

S.M. Mousavi G et al., A comprehensive review of Flywheel Energy Storage System Technology, Renewable and Sustainable Energy Reviews, 2017, 67, 477-490.

Trong Duy Nguyen et al., A Novel Axial Flux Permanent-Magnet Machine for Flywheel Energy Storage System: Design and Analysis, IEEE Transactions on Industrial Electronics, 2011, vol. 58, No. 9.

Mustafa E. Amiryar et al., A Review of Flywheel Energy Storage System Technologies and Their Applications, Appl. Sci., 2017, 7, 286.

Samuel Wicki et al., Clean energy storage technology in the making: An innovation systems perspective on flywheel energy storage, Journal of Cleaner Production, 2017,162,1118-1134.

Funda Sahin et al., Design and development of a high-speed axial-flux, permanent-magnet machine, Technische Universiteit Elndhoven University of Technology, 2001.

M. A. Awadallah, Energy Storage in Flywheels: An Overview, Canadian Journal of Electrical and Computer Engineering, 2015.

Björn Bolund et al., Flywheel energy and power storage systems, Renewable and Sustainable Energy Reviews, 2007, 11, 235-258.

A.A. Khodadoost Arani et al., Review of Flywheel Energy Storage Systems structures and applications in power systems and microgrids, Renewable and Sustainable Energy Reviews, 2017, 69, 9-18.

Taiwan Patent Office, "Office Action", dated Nov. 15, 2019, Taiwan.

* cited by examiner

FLYWHEEL ENERGY STORAGE SYSTEM

CROSS-REFERENCE TO RELATED APPLICATIONS

This non-provisional application claims priority under 35 U.S.C. § 119(a) on Patent Application No(s). 107139438 filed in Taiwan, R.O.C. on Nov. 7, 2018, the entire contents of which are hereby incorporated by reference.

TECHNICAL FIELD

The disclosure relates to a flywheel energy storage system.

BACKGROUND

Flywheel energy storage (FES) system is a way of energy storage, mainly by accelerating the rotor (having a flywheel) to a very high speed, such that energy can be stored in the system as rotational kinetic energy. When the system needs to output energy, according to the principle of conservation of energy, the rotational speed of the flywheel decreases; when the system needs to store energy, it can increase the rotational speed of the flywheel.

In detail, a typical flywheel energy storage system consists of a chamber containing a flywheel and an electric motor assembly assembled to the flywheel. The flywheel has mechanical potential energy while rotating. The stored energy grows in proportion to the mass and the rotational speed of the flywheel. And when the flywheel's torque with respect to the shaft increases, the stored energy increase in proportional to torque squared. The electric motor assembly acts as an energy output/input device, and it can receive the electric power in the form of a motor to drive the flywheel to rotate, and also can convert the mechanical potential energy of the flywheel into and electric power in the form of a power generator.

Therefore, the flywheel energy storage system can operate as an electric motor or a power generator to directly convert mechanical energy and electrical power. Since the rotational speed of the flywheel can be quickly boosted to absorb or release energy, its power is greater than other energy storage device. The power density of the flywheel energy storage system is significantly higher than that of chemical batteries (e.g., lead-acid battery), making the flywheel energy storage system more suitable than the chemical batteries in some applications that demands fast energy storage. As such, the flywheel energy storage system is much widely used in some applications, such as vehicles or other power generating system suchlike household wind power system or independent mobile energy storage unit similar to the chemical battery. The above reasons and advantages make the flywheel energy storage system become more important than ever.

In order to improve the performance of the flywheel energy storage system, the air resistance to the internal components has to be decreased. One of the efficient way is to enclose all of the internal components in the casing and then vacuum the casing to create a vacuum environment for these components. Meanwhile, the motor stator of the electric motor assembly needs to connect to the external device via cable for receiving or outputting electricity; thus, the casing has to have a through hole for the cable. Although the through hole will be sealed after the cable has been disposed through, it still can find vacuum leak at the through hole and thus negatively affect the airtightness of the system. As a result, the performance still fails to meet the requirement. In addition, the vacuum internal space and the outer environment have a very large pressure difference, which would aggravate the vacuum leak. To solve such problem, some would constantly vacuum the system to maintain the vacuum condition, but it is energy wasting and increasing cost.

Further, in order to dissipate heat generated while the motor stator is in operation so as to prevent the accumulation of excessive heat in the coil of the motor stator to cause the winding to burn out or cause the motor to shut down. Moreover, the casing also needs to form another through hole for the cooling pipe. It is understood that the another through hole increases the possibility of air entering into the system, making the airtightness in the system more difficult to maintain As such, how to maintain the vacuum condition of the flywheel energy storage system to solve the aforementioned problems becomes an important topic in the field.

SUMMARY

One embodiment of the disclosure provides a flywheel energy storage system including a casing, a shaft, a flywheel and an electric motor assembly. The casing has an inner vacuum chamber, at least one outer accommodating slot and at least one separator which separates the inner vacuum chamber from the at least one outer accommodating slot. The shaft is rotatably disposed in the inner vacuum chamber. The flywheel is located in the inner vacuum chamber and fixed to the shaft. The electric motor assembly includes a first motor rotor and a motor stator. The motor stator is accommodated in the at least one outer accommodating slot and fixed to the at least one separator. The first motor rotor is fixed on the shaft and located between the shaft and the motor stator. Part of the at least one separator located between the first motor rotor and the motor stator includes magnetically permeable material.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known main structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained unless the terms have a specific meaning in the present disclosure. Furthermore, in order to simplify the drawings, some conventional structures and components are drawn in a simplified manner to keep the drawings clean.

Further, the terms, such as "end", "portion", "part", "area" and the like may be used in the following to describe specific components and structures or specific features thereon or therebetween, but are not intended to limit these components and structures. In the following, it may use terms, such as "substantially", "approximately" or "about"; when these terms are used in combination with size, concentration, temperature or other physical or chemical properties or characteristics, they are used to express that, the deviation existing in the upper and/or lower limits of the range of these properties or characteristics or the acceptable tolerances caused by the manufacturing tolerances or analysis process, would still able to achieve the desired effect.

Furthermore, unless otherwise defined, all the terms used in the disclosure, including technical and scientific terms, have their ordinary meanings that can be understood by those skilled in the art. Moreover, the definitions of the above terms are to be interpreted as being consistent with the technical fields related to the disclosure. Unless specifically defined, these terms are not to be construed as too idealistic or formal meanings. The terms of the components in the disclosure are sometimes referred to in a more concise manner, depending on the requirements of the description, and should be understood by the reader.

Figure 1:
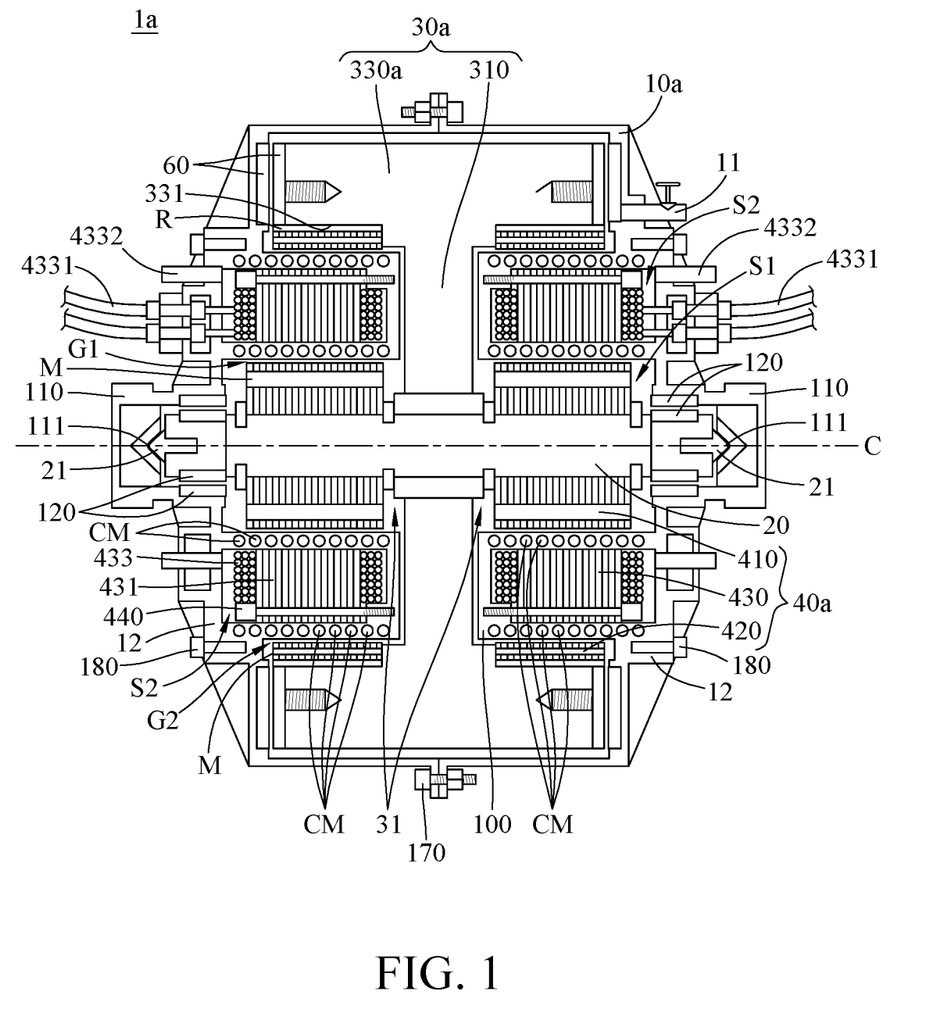
FIG. 1 is a side view of a flywheel energy storage system according to one embodiment of the disclosure.
Figure 2:
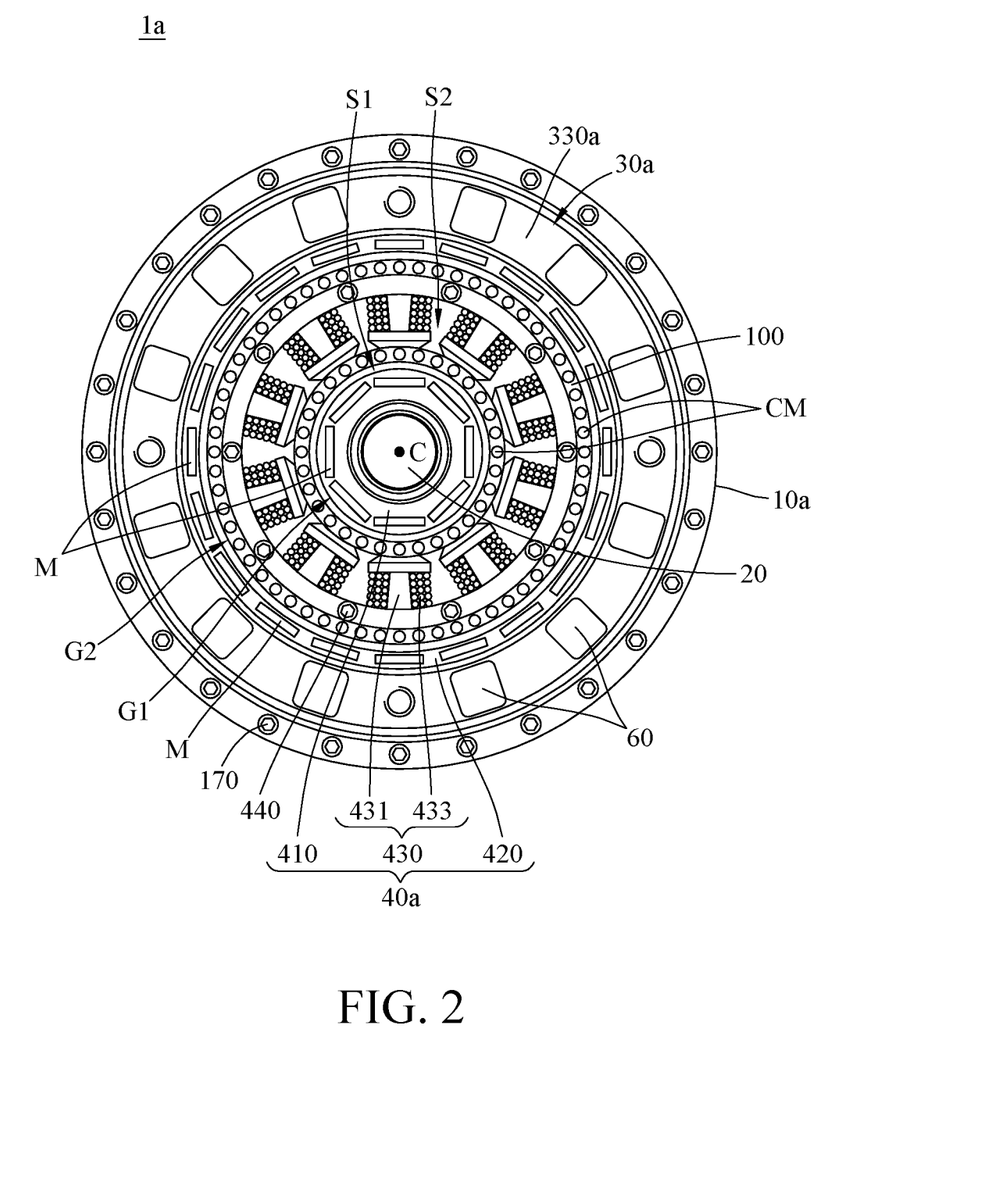
FIG. 2 is a top view of the flywheel energy storage system in FIG. 1.
Figure 3:
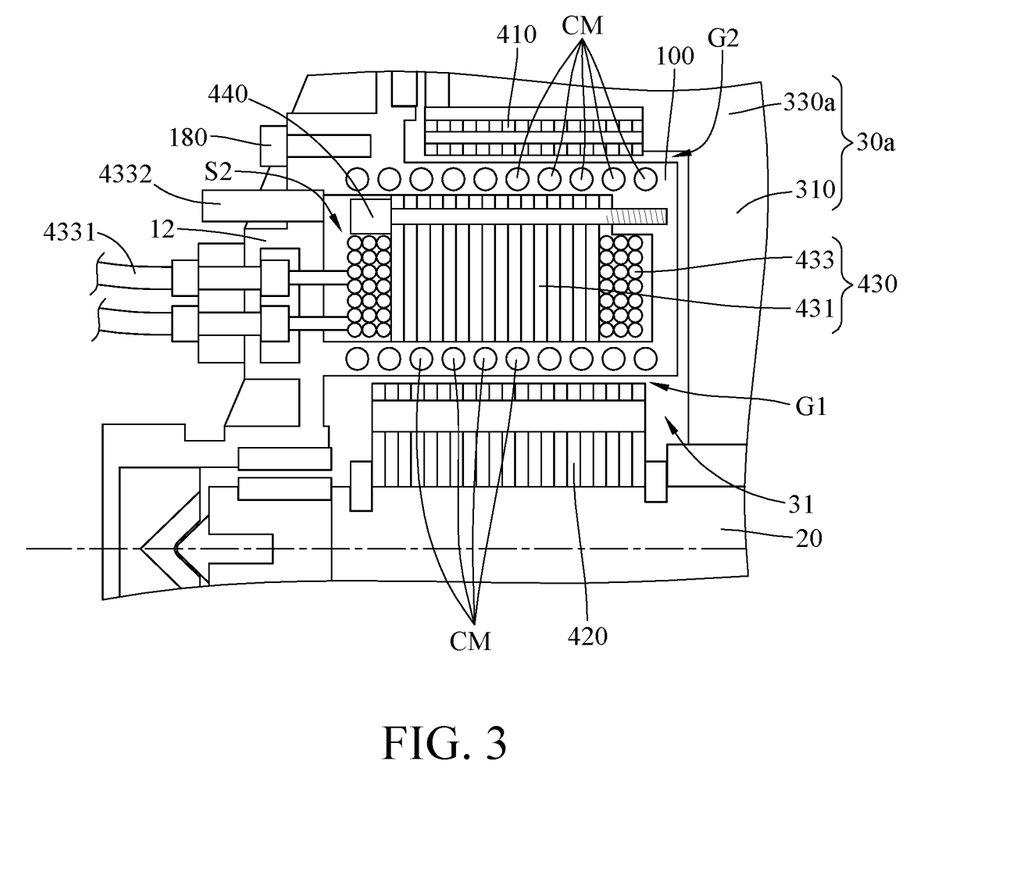
FIG. 3 is a partially enlarged view of the flywheel energy storage system in FIG. 1.
Figure 4:
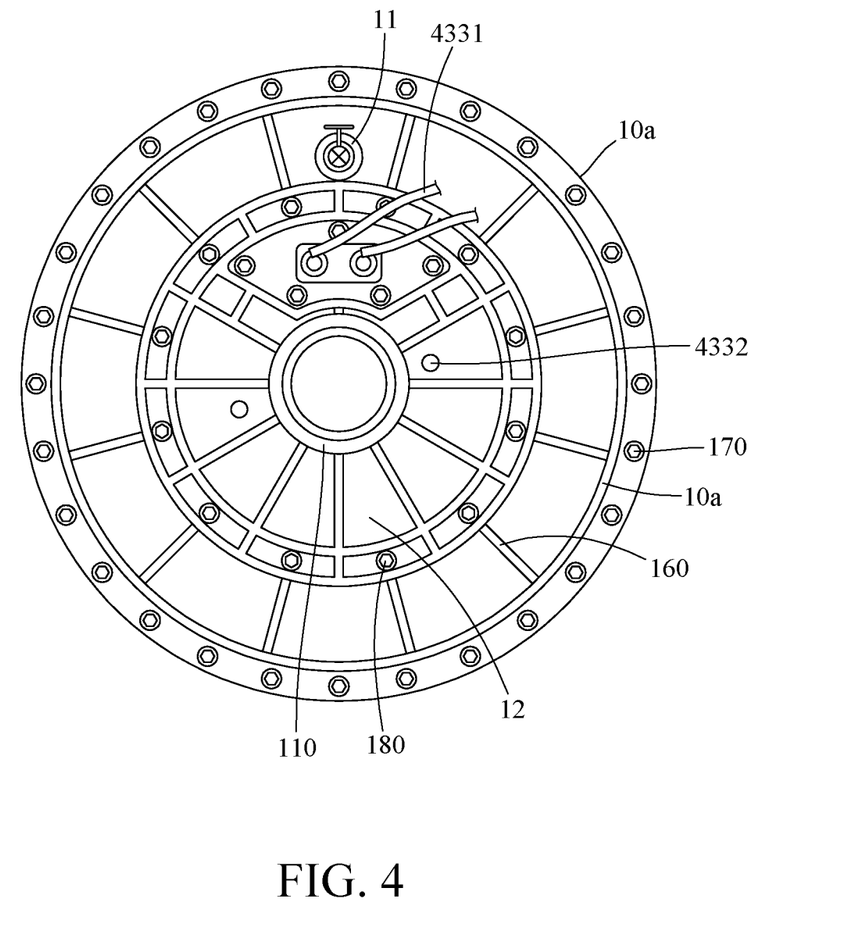
FIG. 4 is a top view of the casing of the flywheel energy storage system in FIG. 1.

Please refer to FIGS. 1-4, FIG. 1 is a side view of a flywheel energy storage system according to one embodiment of the disclosure, FIG. 2 is a top view of the flywheel energy storage system in FIG. 1, FIG. 3 is a partially enlarged view of the flywheel energy storage system in FIG. 1, and FIG. 4 is a top view of the casing of the flywheel energy storage system in FIG. 1.

This embodiment provides a flywheel energy storage system 1a, may also be called "system" in the following. Flywheel energy storage system 1a is, for example, a horizontal-type flywheel energy storage system, which includes a casing 10a, a shaft 20, a flywheel 30a and two electric motor assemblies 40a.

The casing 10a may be made of highly rigid and non-magnetic material, such as aluminum alloy, but the embodiment is not limited thereto. The casing 10a may have rib structures thereon to improve the overall structural strength (e.g., the rib structures 160 shown in FIG. 4). In addition, the casing 10a may be made of a single piece or consisted of plural pieces. In the case that the casing 10a is assembled by a plurality of pieces, the pieces can be fixed to each other via bolts (e.g., the bolt 170 shown in the figure) and the connections between the adjacent pieces can be airtight by applying or additional cover or sealant thereto.

In this embodiment, the casing 10a surrounds an inner vacuum chamber S1 therein, and the casing 10a further has two outer accommodating slots S2 respectively located on two opposite sides thereof and two separators 100 for separating the outer accommodating slots S2 from the inner vacuum chamber S1. Specifically, the separators 100 and the casing 10a are made of a single piece; in detail, the separators 100 are indented structures on two opposite sides of the casing 10a so as to respectively form the two outer accommodating slots S2. Therefore, the separators 100 are located between the inner vacuum chamber S1 and the outer accommodating slots S2, and the separators 100 act as barriers between the inner vacuum chamber S1 and the outer accommodating slots S2. In this embodiment, the inner vacuum chamber S1 is separated from the outer accommodating slots S2, and the openings of the outer accommodating slots S2 face away from the inner vacuum chamber S1. The casing 10a has a vacuum valve 11. The vacuum valve 11 may be connected to a vacuum pump (not shown) used to remove gas from the inner vacuum chamber S1. Therefore, the inner vacuum chamber S1 can be vacuumed via the vacuum valve 11. The shaft 20 and the flywheel 30a and the motor rotors 410 of the electric motor assemblies 40a are all accommodated within the inner vacuum chamber S1; thus when the inner vacuum chamber S1 is vacuumed, the friction with air occurring during the rotation of the shaft 20, the flywheel 30a and the motor rotors 410 can be greatly reduced, reducing the air resistance in the casing 10a and thus avoiding unwanted energy waste.

In addition, the casing 10a has two bearing seats 110, the two bearing seats 110 each is disposed with one or more bearings 120. The shaft 20 is a rotatable component. Two opposite ends of the shaft 20 are respectively rotatably disposed through the bearings 120 and inserted into the bearing seats 110, such that the shaft 20 is rotatable with respect to the casing 10a about a central axis C and thus being rotatably located within the inner vacuum chamber S1. The bearing 120 is, for example, a magnetic bearing, and can able to largely reduce the friction on the shaft 20, even causing the shaft 20 to have near zero friction with the bearing seat 110. Also, the bearings 120 surround the shaft 20, such that the shaft 20 can be maintained at the desired position whether it is in vertical or horizontal manner. This helps the system to be applied in the application that would change the orientation, such as electrical vehicle.

In more detail, in this embodiment, two opposite ends of the shaft 20 each have a cone-shaped head 21. The cone-shaped heads 21 may be additionally embedded into the shaft 20, but the disclosure is not limited thereto; in other embodiments, the cone-shaped heads and the shaft may be made of a single piece. The tips of the two cone-shaped heads 21 are substantially aligned with the central axis C of the shaft 20. The bearing seats 110 each have a cone-shaped hole 111. The cone-shaped heads 21 respectively fit the shapes of the cone-shaped holes 111, and the tips of the cone-shaped holes 111 are also substantially aligned with the central axis C of the shaft 20. Therefore, when the cone-shaped heads 21 are respectively placed into the cone-shaped holes 111 of the bearing seats 110, the shaft 20 can be automatically and precisely positioned to the desired location. This helps to facilitate the installation of the shaft 20 and also helps to prevent the shaft 20 from unexpectedly shakings so as to stable the movement of the shaft 20. As result, the accuracy of the movement of the rotatable components of the flywheel energy storage system 1a is increased, such that the rotatable components are prevented from unwantedly contacting or hitting the immovable components of the flywheel energy storage system 1a. If the precision is insufficient, the rotatable components would start to yaw. As the rotation speed increases, the yaw movement of the shaft will increase, resulting in an increase in vibration. This may cause great damage to the overall system. In severe cases, the components in the system may rupture and fly out, causing accidents such as personal injury.

The flywheel 30a is able to store energy. To order to store higher energy per unit volume or weight (i.e., to increase the energy density), in this embodiment or other embodiments, the shape of the flywheel 30a is substantially cylindrical. As shown in figure, the flywheel 30a includes a hub 310 and an annular part 330a. The shaft 20 is disposed through the annular part 330a, and the annular part 330a is connected and fixed to the shaft 20 through the hub 310, such that the flywheel 30a and the shaft 20 can be rotated together. In this embodiment, the flywheel 30a and the shaft 20 are concentric and their centers coincide on the central axis C of the shaft 20. Note that the disclosure is not limited by how the hub 310 is fixed to the shaft 20.

Due to the configuration of the annular part 330a, most of the mass of the flywheel 30a is located away from the shaft 20 (i.e., located away from the central axis C) and thus helping to increase the rotational torque so as to increase the density of the rotational potential energy. In detail, due to the configuration of the annular part 330a, most of the mass of the flywheel 30a is located at where the rotational torque is relatively high, such that the weight of the flywheel 30a is largely decreased but the rotational inertia is increased, thereby increasing the ratio of inertia to weight. The reason is that the potential energy of the flywheel 30a is generated by the rotational inertia, the potential energy is proportional to the inertia and rotational speed, and the inertia is proportional to the mass and is in proportion to torque squared. Thus, the portion of the flywheel 30a away from the central axis C (i.e., the annular part 330a) is the area that can produce a larger torque and thus producing larger potential energy. As such, removing the middle part of the flywheel 30a would not lower too much the inertia but would be able to largely decrease the overall weight of the flywheel 30a, that is, to largely improve the energy density of the flywheel 30a per unit weight.

Additionally, the material of the flywheel 30a may have high structural strength, in high density and be non-magnetic or electrical insulation, such as using carbon steel, a high density non-magnetic materials (e.g., cast steel having lead), or a composite electrical insulation material containing lead particles, helping to increase the mass per unit volume and to prevent it from breaking due to huge centrifugal force, but the disclosure is not limited thereto.

In this embodiment, the annular part 330a of the flywheel 30a has cavities 31 respectively located at two opposite sides of the hub 310. The two electric motor assemblies 40 are respectively located in the cavities 31, and the separators 100 of the casing 10a respectively extend toward the two cavities 31. Specifically, each electric motor assembly 40a includes a first motor rotor 410, a second motor rotor 420 and a motor stator 430. The first motor rotor 410 and the second motor rotor 420 each are made of laminated silicon steel sheets, which can avoid the formation of eddy current on the surface of the magnetic material while the magnetic field passing through. In this embodiment, the first motor rotor 410 and the second motor rotor 420 are both located within the cavity 31, such that both the first motor rotor 410 and the second motor rotor 420 are located within the inner vacuum chamber S1. Specifically, the first motor rotor 410 is fixed on the shaft 20, and the second motor rotor 420 is fixed on an annular internal wall 331 of the annular part 330a. In such a configuration, the first motor rotor 410 and the second motor rotor 420 are able to be rotated by the shaft 20 and the flywheel 30a; thus the first motor rotor 410, the second motor rotor 420, the shaft 20 and the flywheel 30a are considered as rotatable components (also called movable components) to the system and can be rotated synchronously.

In addition, there may be one or more non-magnetic materials R located between the second motor rotor 420 and the annular internal wall 331 of the annular part 330a. If the material of the flywheel 30a has magnetic permeability, the non-magnetic materials R can block the magnetic line of force so as to prevent the variation of the magnetic line of force from producing eddy current on the annular internal wall 331 to unwantedly consume energy, but the disclosure is not limited by the non-magnetic material R and what it is made of.

The motor stators 430 each include at least one stator core 431 and windings 433 wound on the stator core 431. Note that the type and the arrangement of the windings 433 are not restricted. The motor stators 430 are respectively fixed in the outer accommodating slots S2. From side view, the first motor rotors 410 are located closer to the central axis C than the second motor rotors 420 and the motor stators 430, the separators 100 extend into the cavities 31 of the flywheel 30a and surround the first motor rotors 410; that is, the outer accommodating slots S2 surround the first motor rotors 410. The motor stators 430 are respectively accommodated within the outer accommodating slots S2 so as to surround the first motor rotors 410. And the second motor rotors 420 surround the motor stators 430; that is, the motor stators 430 are located between the first motor rotors 410 and the second motor rotors 420.

In more detail, the stator cores 431 are attached to (or in contact with) the separators 100 so as to be located within the outer accommodating slots S2. The stator cores 431 may be fixed to the separators 100 via bolts 440. As mentioned, the separators 100 are located in the cavities 31 of the flywheel 30a; thus the motor stators 430 in the outer accommodating slots S2 formed by the separator 100 are also located within the areas of the cavities 31 of the flywheel 30a. Since the separators 100 separate the motor stators 430 from the first motor rotors 410 and the second motor rotors 420, the motor stators 430 are still separated from the inner vacuum chamber S1 and located outside the casing 10a although they are in the areas of the cavities 31.

Please be noted that, in this embodiment and other embodiments, the material of part of the separator 100 includes magnetically permeable material CM, such as iron, but the disclosure is not limited thereto. Therefore, when the motor stators 430 contact the separators 100, at least part of the separator 100 is magnetically permeable. Such part of the separator 100 can be considered as an extension of the motor stator 430. Accordingly, the separators 100 located between the motor stators 430 and the first motor rotors 410 and second motor rotors 420 would not have significantly negative effect on magnetic flux so would not to the electric motor performance.

Note that any other design, that can separate the motor stator and motor rotor without decreasing the performance, should belong to the scope of the disclosure. Therefore, the disclosure is not limited by the distribution or the manufacturing process of the magnetically permeable material in the separator, as long as that the specific part of the separator contains a certain amount of material that allows magnetic field to pass through, should belong to the scope of the disclosure.

As shown in figure, there is a first gap G1 between the first motor rotors 410 and the separators 100, and there is a second gap G2 between the second motor rotors 420 and the separators 100. These gaps (i.e., the first and second gaps G1 and G2) allow the first motor rotors 410 and the second motor rotors 420 to cooperate with the motor stators 430 and the separators 100 without mechanical interference. In such a configuration, the first motor rotors 410, fixed on the shaft 20, and the second motor rotors 420, fixed to the annular internal wall 331 of the annular part 330a are able to be rotated synchronously with the shaft 20 so as to be rotated with respect to the motor stators 430 that are located within the outer accommodating slots S2 formed by the separators 100 and located outside the casing 10a and thus producing torque.

In addition, the flywheel energy storage system 1a further includes two stator side covers 12 that are configured to cover the openings of the outer accommodating slots S2 after the motor stators 430 had been accommodated in the outer accommodating slots S2. The stator side covers 12 may be fixed at the outer accommodating slots S2 via, for example, bolts 180. It is understood that assembling the stator side covers 12 to cover the outer accommodating slots S2 may not be airtight and thus helping to simplify the overall assembly process. As shown in FIG. 1 and FIG. 4, the windings 433 of the motor stators 430 is connected to a connecting cable 4331 that is used as a power cable. Electricity can be applied into the windings 433 of the motor stator 430 through the connecting cable 4331. To do so, the connecting cable 4331 is disposed through the stator side cover 12. Further, a cooling pipe 4332 is also disposed through the stator side cover 12. Since the holes on the stator side cover 12 for the connecting cable 4331 and cooling pipe 4332 are located outside the casing 10a (i.e., separated from the inner vacuum chamber S1), they are no need to be airtight. Also, the assembly processes for the connecting cable 4331 and cooling pipe 4332 are simplified.

When electricity is applied to the windings 433 of the motor stator 430 through the connecting cable 4331, the magnetic field of the windings 433 passes through the magnetically permeable materials CM of the separators 100 located at both sides of the motor stators 430 and also passes through the first and second gaps G1 and G2 and thus interacting with the first motor rotors 410 located at the inner side of the motor stators 430 and the second motor rotors 420 located at the outer side of the motor stators 430.

The electric motor assemblies 40a are substantially respectively located in the cavities 31 of the flywheel 30a to make best use of the inner space of the flywheel 30a and to largely decrease the overall volume of the flywheel energy storage system 1a, thereby increasing the energy density of the system. Accordingly, the geometric configuration of the flywheel 30 not only helps to decrease the overall weight but also helps to accommodate the electric motor assemblies 40a.

In this embodiment, the flywheel 30a and the shaft 20 are concentric and their centers coincide on the central axis C, and the electric motor assemblies 40a are arranged as taking the hub 310 of the flywheel 30a as the central line of symmetry, such that the whole system is substantially a symmetrical duo-electric-motors configuration. This helps to obtain better dynamic balance and mechanical dynamic stress distribution when the above rotatable components rotate at high speed and is beneficial to the durability of the bearings and to improve the stability of the overall system.

In addition, the first motor rotor 410 and the second motor rotor 420 are disposed with at least one permanent magnet M, such that both the first motor rotor 410 and the second motor rotor 420 can produce a permanent magnetic field for creating magnetic force with the motor stator 430. Note that the quantity of the permanent magnets M can be adjusted according to actual requirements.

Accordingly, the permanent magnetic fields of the first motor rotor 410 and the second motor rotor 420 would form independent magnetic loops (magnetic flux paths) on different portions of the motor stator 430 to respectively interact with the windings 433 of the motor stator 430, increasing the magnetic flux per unit area. Also, since the magnetic line of force exerts on different portions of the motor stator 430 so that the main magnetic fields (i.e., the relatively strong area) of the magnetic loops do not overlap with each other. Therefore, although the overall magnetic flux is greatly increased, the magnetic saturation of the magnetic material of the motor stator 430 is still less possible to occur.

Due to the large increase of the magnetic flux, when the flywheel energy storage system 1a performs motor function, applying the same amount of current to the flywheel energy storage system 1a can create a greater force to rotate the flywheel 30a, meaning that the input power is enhanced; when the flywheel energy storage system 1a performs power generator function, the flywheel 30a rotates the first motor rotors 410 and the second motor rotors 420, and a greater electromotive force is created as the magnetic line of force passes through the windings 433 of the motor stators 430, meaning that the output power is enhanced. This allows the first motor rotors 410 and the second motor rotors 420 to use thinner permanent magnet M to generate the required amount of magnetic flux.

As such, when the external electric power is applied to the flywheel energy storage system 1a, the flywheel energy storage system 1a can operate as an electric motor, and the changing electromagnetic fields are produced while the electric power passing through the windings 433 of the motor stators 430 to force the first motor rotors 410 and the second motor rotors 420 to rotate, thereby forcing the shaft 20 and the flywheel 30a, that are fixed to the first motor rotors 410 and the second motor rotors 420, to rotate together. As the flywheel 30a rotates, it starts to store energy. As long as the electric motor assemblies 40a continuously generates magnetic force to drive the flywheel 30a to rotate, the rotational speed of the flywheel 30a can be continuously increased, allowing the flywheel energy storage system 1a to store energy until the magnetic line of force of the magnetic material is saturated.

On the other hand, when an external device requires electrical power from the system, there will be no external electric power imported into the system, then the magnetic line of force results from the permanent magnetic fields of the first and second motor rotors 410 and 420 passes through the windings 433 of the motor stators 430, and the permanent magnetic fields are continuously moved by the rotating flywheel 30a so as to continuously interact with the windings 433 and thus causing the windings 433 to produce electromotive force, i.e., electric potential energy. The electric potential energy can be provided to the external device via the connecting cable 4331. At this moment, the flywheel energy storage system 1a acts as an electric power source that is able to provide electric energy to external device.

Accordingly, there are first and second motor rotors 410 and 420 interacting with different portions (e.g., the inner and outer portions) of the motor stators 430 at the same time, the magnetic line of force results from the first and second motor rotors 410 and 420 would pass through the windings 433 whether the system is outputting electric energy or receiving electrical power; when the magnetic force and the electric power interacts with each other, the inner and outer portions of the motor stator 430 both have a magnetic field of the permanent magnet M, and the magnetic line of force is largely increased but not overlapping, thereby greatly increasing the power density and also preventing the magnetic saturation of the magnetic materials.

In addition, in this embodiment, the motor stators 430 are located at the outer side of the first motor rotors 410, such that the amount of the windings 433 is large and thus helping to improve power generation; and the second motor rotors 420 are located at the outer side of the motor stators 430, such that the second motor rotors 420 can contain a larger amount of the permanent magnets M and thus improving the motor function and increasing the rotational speed of the flywheel 30a in a faster manner.

In addition, in this embodiment, the flywheel energy storage system 1a further includes a plurality of bearings 60 that are respectively disposed on two opposite end surfaces 332 of the annular part 330a of the flywheel 30a facing the casing 10a. The bearings 60 are also magnetic bearings, and the bearings 60 are larger than the bearings 120 so that they can provide a larger magnetic force to reduce mechanical friction between the rotatable components (e.g., the first motor rotors 410, second motor rotors 420, flywheel 30a and shaft 20), for further stabilizing the operation of the system. Note that the magnetic bearings 60 and 120 can be precisely aligned due to the cooperation of the cone-shaped heads 21 and the cone-shaped concaves 111.

Figure 5:
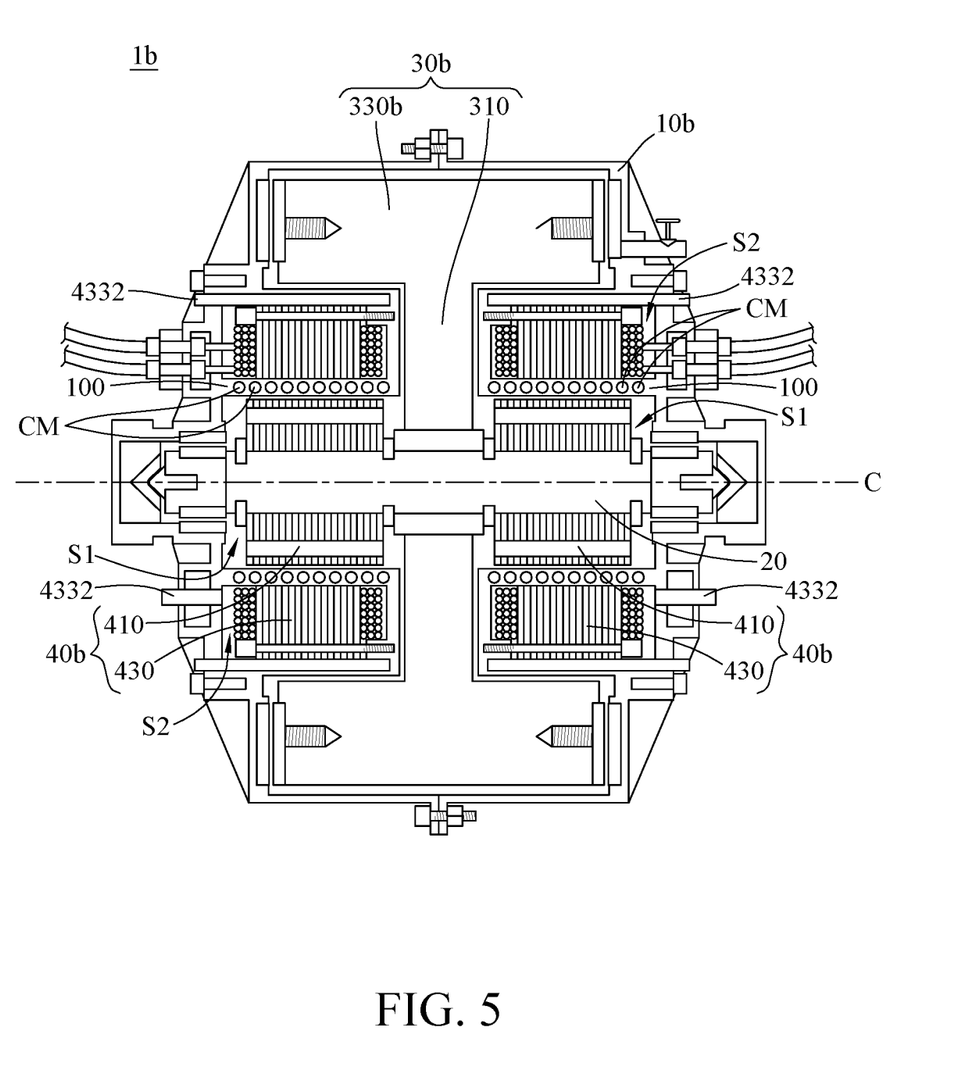
FIG. 5 is a side view of a flywheel energy storage system according to another embodiment of the disclosure.

In other embodiments, the flywheel energy storage system may not include the second motor rotor 420. For example, please refer to FIG. 5, FIG. 5 shows a side view of a flywheel energy storage system 1b according to another embodiment of the disclosure. One of the main differences between this and previous embodiments is that an electric motor assembly 40b of the flywheel energy storage system 1b only includes a first motor rotor 410 disposed in the inner vacuum chamber S1 without the second motor rotor 420 fixed to an annular part 330b of the flywheel 30b; in such a case, only the part of the separators 100 that is located between the motor stators 430 and the first motor rotors 410 includes the magnetically permeable material CM. Substantially, the configuration of the flywheel energy storage system 1b also can achieve the same technical effect as the same as the flywheel energy storage system 1a in the previous embodiments. Note that the detail descriptions about the other components of the flywheel energy storage system 1b that are not mentioned in this paragraph can be referred to the previous embodiment.

Figure 6:
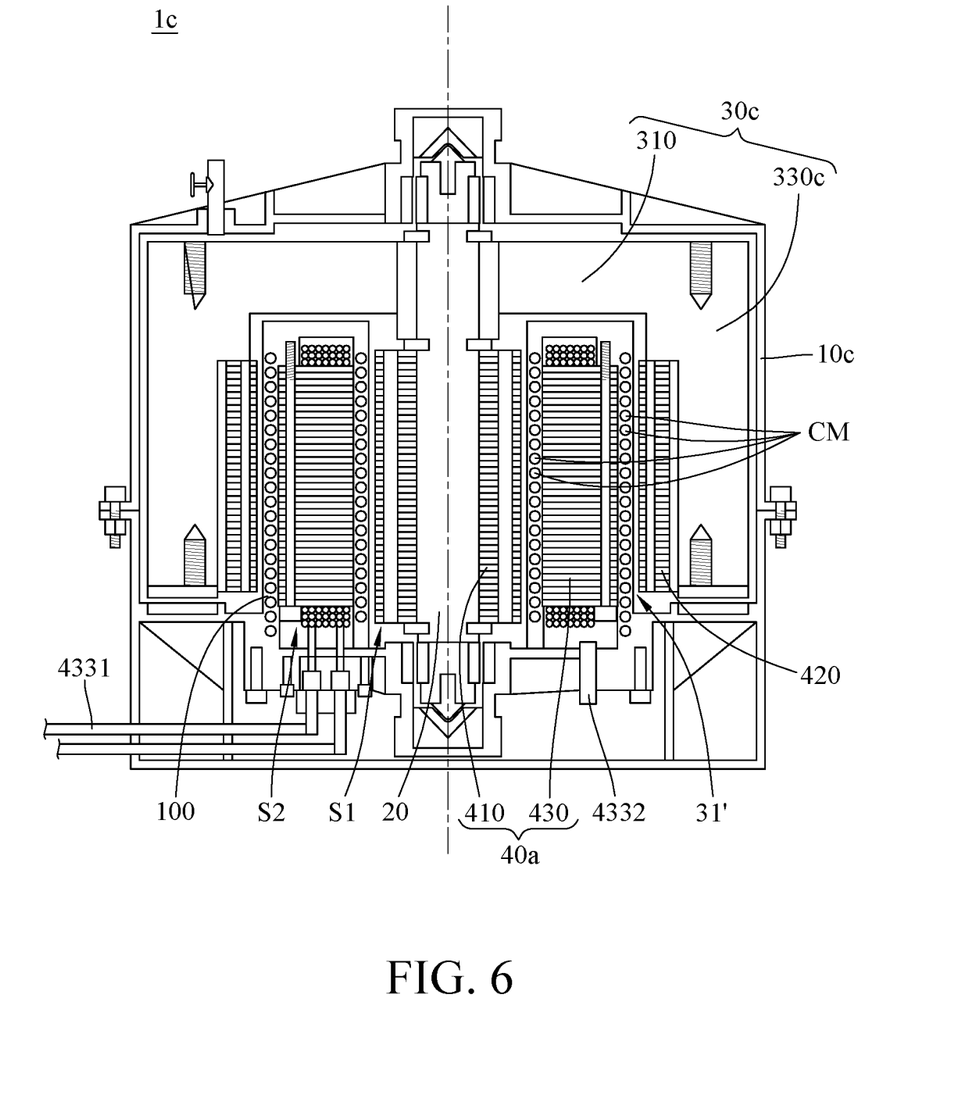
FIG. 6 is a side view of a flywheel energy storage system according to still another embodiment of the disclosure.

Then, please refer to FIG. 6; FIG. 6 is a side view of a flywheel energy storage system 1c according to still another embodiment of the disclosure. One of the main differences between this and previous embodiments is the quantity of the electric motor assembly, and other components can be properly modified according to such difference.

In the flywheel energy storage system 1c, an annular part 330c of the flywheel 30c only has one cavity 31' on one side of the hub 310 for accommodating the first motor rotor 410 and second motor rotor 420 of a single electric motor assembly 40a. In response to this configuration, there is only one separator 100 and one outer accommodating slot S2 formed by the separator for accommodating the motor stator 430. Similarly, the part of the separator 100 located between the motor stator 430 and the first motor rotor 410 and second motor rotor 420 in the inner vacuum chamber S1 includes magnetically permeable material CM, the flywheel energy storage system 1c also can achieve the same technical effect as the same as the flywheel energy storage system in the previous embodiments. Note that the detail descriptions about the other components of the flywheel energy storage system 1c that are not mentioned in this paragraph can be referred to the previous embodiment.

It is understood that the electric motor assembly 40a of the flywheel energy storage system 1c may be modified to be an electric motor assembly that only has one first motor rotor; in such a case, only the part of the separator located between the first motor rotor and the motor stator contains the magnetically permeable material.

In addition, in this embodiment, the cavity 31' is located at one side of the flywheel 30c, but the disclosure is not limited by the orientation of the cavity 31', and FIG. 6 is an exemplary embodiment that the cavity 31' is oriented downward.

Also, in such orientation, the shaft 20 in the flywheel energy storage system 1c can be rotated in a vertical manner, such that the flywheel power storage system 1c becomes a vertical-type flywheel power storage system, allowing most of the system's components to be supported by the ground. Therefore, the system is allowed to use a larger mass of flywheel. In addition, all of the rotatable components are arranged as taking the shaft as the central line of symmetry; and only the end surface of the flywheel facing downward is required to be mounted with the bearings (e.g., bearings 60), which helps to reduce the cost.

According to the flywheel energy storage system as discussed above, the separator of the casing separates the inner vacuum chamber for accommodating the shaft, flywheel and motor rotor from the outer accommodating slot for accommodating the motor stator, and part of the separator between the motor rotor and the motor stator includes magnetically permeable material that can be considered as the extension of the motor stator; therefore, the motor stator can be located outside the casing without affecting the performance of the electric motor assembly. As such, the motor stator is fundamentally irrelevant to the airtightness of the inner vacuum chamber of the casing. And the connecting cable of the motor stator and the cooling pipe for the motor stator are no longer needed to be disposed through the casing to affect the airtightness. As a result, the performance of the flywheel energy storage system is easy to be maintained, and the assembly process of the flywheel energy storage system is simplified.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A flywheel energy storage system, comprising:
  a casing, having an inner vacuum chamber, at least one outer accommodating slot and at least one separator which separates the inner vacuum chamber from the at least one outer accommodating slot;
  a shaft, rotatably disposed in the inner vacuum chamber;
  a flywheel, located in the inner vacuum chamber and fixed to the shaft; and
  at least one electric motor assembly, comprising a first motor rotor and a motor stator, the motor stator accommodated in the at least one outer accommodating slot and fixed to the at least one separator, the first motor rotor fixed on the shaft and located between the shaft and the motor stator, wherein part of the at least one separator located between the first motor rotor and the motor stator comprises magnetically permeable material;

wherein the flywheel comprises a hub and an annular part, the shaft is disposed through the annular part, the annular part is fixed to the shaft via the hub, the annular part has at least one cavity located at one side of the hub, both the at least one separator and the first motor rotor are located in the at least one cavity, and the at least one cavity is separated from the at least one outer accommodating slot.

2. The flywheel energy storage system according to claim 1, wherein the inner vacuum chamber is separated from the at least one outer accommodating slot.

3. The flywheel energy storage system according to claim 1, wherein the at least one outer accommodating slot surrounds the first motor rotor.

4. The flywheel energy storage system according to claim 1, further comprising a stator side cover disposed on the casing to cover an opening of the at least one outer accommodating slot, and a connecting cable of the motor stator is disposed through the stator side cover.

5. The flywheel energy storage system according to claim 1, further comprising a stator side cover and a cooling pipe, the stator side cover disposed on the casing to cover an opening of the at least one outer accommodating slot, and the cooling pipe disposed through the stator side cover.

6. The flywheel energy storage system according to claim 1, wherein the motor stator comprises at least one stator core and a plurality of windings wound on the at least one stator core, and the at least one stator core is in contact with the at least one separator.

7. The flywheel energy storage system according to claim 1, the at least one electric motor assembly further comprises a second motor rotor, the second motor rotor is fixed on an annular internal wall of the annular part and is located in the at least one cavity, wherein another part of the at least one separator located between the second motor rotor and the motor stator comprises magnetically permeable material.

8. The flywheel energy storage system according to claim 7, wherein the second motor rotor surrounds the at least one separator.

9. The flywheel energy storage system according to claim 1, wherein a quantity of each of the at least one cavity, the at least one electric motor assembly, the at least one outer accommodating slot and the at least one separator is two, the cavities are respectively located at two opposite sides of the hub, the first motor rotors of the electric motor assemblies are respectively located in the cavities, the separators are respectively located in the cavities, and the cavities are separated from the outer accommodating slots.

* * * * *